Patented Feb. 16, 1937

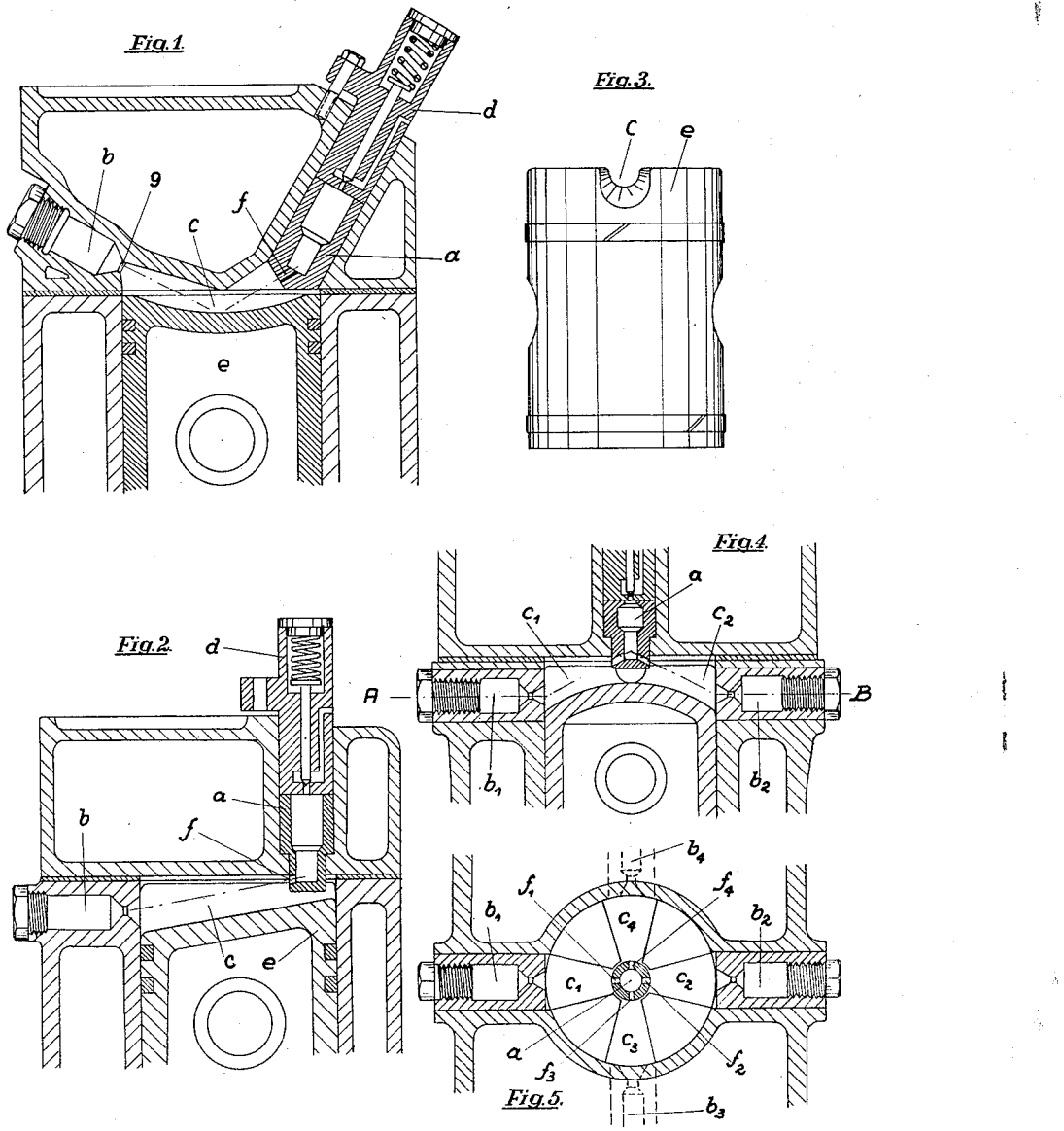

2,071,241

UNITED STATES PATENT OFFICE 2,071,241

INTERNAL COMBUSTION ENGINE

Kurt Thomas, Baden, Germany, assignor to Daimler Benz Aktiengesellschaft, Stuttgart-Unterturkheim, Germany Application February 5, 1934, Serial No. 709,885
In Germany February 13, 1933

15 Claims. (Cl. 123—32)

This invention relates to an injection internal combustion engine having a precombustion chamber and an air reservoir and consists substantially in this, that the precombustion chamber and the air reservoir are so arranged with respect to one another that the jet of fuel emerging from the precombustion chamber into the main combustion space is directed substantially towards the outlet of the air reservoir into the main combustion space, the precombustion chamber and the air reservoir being preferably disposed opposite one another, for instance on opposite sides of the main combustion space.

The invention has for its object among other things to obtain a smoother running of the engine, a more favourable combustion cycle and a lower combustion consumption than has been the case with known engines having an air reservoir or a precombustion chamber.

As compared with known engines having an air reservoir that according to the invention has among other things the advantage of a better atomization owing to the employment of a precombustion chamber in front of the main combustion space, while as compared with known engines having a precombustion chamber it has the advantage of smoother running. This advantage is due to the fact that in the known engines with a precombustion chamber apart from their other advantages the fuel which is suddenly projected into the combustion space through the precombustion chamber becomes ignited only as a whole after a certain ignition lag, in a relatively explosive manner. This produced a fairly great pressure increase which in certain circumstances caused a relatively harsh running which in the diagram is shown by a more or less steeply ascending ignition apex.

This disadvantage can be overcome by the present invention. The procedure is somewhat as follows:

On its way from the precombustion chamber to the air reservoir the jet of fuel takes up heat from the highly compressed air of the main combustion space and passes well prepared and probably partially burning into the air reservoir. In the latter, owing to the limited quantity of air present in the air reservoir, a partial combustion commences. The consequent rise in pressure can however not act like a blow on the piston owing to the nozzle-like aperture of the air reservoir. The burning gases and particles of fuel emerging at great velocity will produce a good churning up of the air present in the main combustion space and consequently ensure an immediate burning of the fuel and air mixture to the extent to which it leaves the air reservoir. Through this method of combustion it becomes possible to keep the pressure rises low and thereby cause the engine to run more smoothly.

In the accompanying drawing three constructional examples of the invention are shown in Figs. 1, 2 and 4. Fig. 3 shows a view of the piston of Fig. 2 seen from the left, and Fig. 5 is a horizontal section on line A—B of Fig. 4.

$a$ is a precombustion chamber, into which the fuel is injected through a nozzle $d$ in a known manner, $b$ is the air reservoir or reservoirs and $c$ the main combustion space formed above the piston $e$.

As will be seen from Fig. 1 the precombustion chamber and the air reservoir are arranged approximately symmetrically with respect to the cylinder axis and at an inclination thereto. The jet of fuel emerging from the aperture $f$ of the precombustion chamber is in this case directed not directly but only indirectly by reflection at the end of the piston towards the aperture $g$ of the air reservoir. This makes it possible to arrange the precombustion chamber and the air reservoir in the cylinder head.

In the arrangement according to Fig. 2 a reflection of the jet of fuel is not necessary. In this case the precombustion chamber is arranged on one side of the main combustion space parallel to the cylinder axis and is provided with one or more apertures $f$ which are directed as a whole or in part towards the air reservoir. In this arrangement the main combustion space has the form of a channel-like space flaring gradually from the precombustion chamber, at the end of which the air reservoir is disposed, approximately in the direction of this channel space, perpendicular to the cylinder axis. This form of main combustion space (in the upper dead centre position of the piston) enables the jet of fuel to follow a particularly suitable course. It thus becomes possible for practically the whole of the quantity of fuel ejected from the precombustion chamber to be projected directly into the air reservoir, insofar as it is not already burning in its more finely divided marginal zone.

In the constructional form shown in Figs. 4 and 5 a central precombustion chamber having for instance 4 apertures $f_1$, $f_2$, $f_3$, $f_4$ is provided. With each of these apertures a separate air reservoir $b_1$, $b_2$, $b_3$, $b_4$ may be associated. The arrangement may however be such that only some of the apertures or some of the jets of fuel, for instance the apertures $f_1$ and $f_2$ have air reservoirs opposite them, while the other apertures (or the rest of the quantity of fuel or of the precombustion chamber contents) operate without air reservoirs. The main combustion space may again be formed by separate sectors $c_1$ to $c_4$ or in any other suitable manner.

The construction shown in Figs. 4 and 5 has the advantage that a particularly uniform distribution of the fuel over the whole of the cylinder area is obtained. The reduction in the distance between the precombustion chamber and the air reservoir may in some circumstances be of advantage, as a lower penetrating force of the precombustion chamber jet is required for reaching the aperture of the air reservoir.

It is not absolutely necessary for the jet from the precombustion chamber to impinge exactly on the orifice of the air reservoir, for even when this is not entirely the case an at least somewhat smoother working of the engine will result. For the rest the invention may be carried out in a great number of different ways, more particularly as regards the arrangement and form of the main combustion space, precombustion chamber and air reservoir. For instance the latter may also be arranged in the piston or, as applied to an arrangement such as that shown in Figs. 4 and 5, in the cylinder head, the precombustion chamber contents being conveyed by reflection of the jet to the air reservoir or reservoirs. A plurality of precombustion chambers may also be provided, which co-operate either as a whole or in part with a corresponding number of air reservoirs or jointly with one or several air reservoirs.

What I claim is:

1. In an internal combustion engine a main combustion space, a precombustion chamber, a fuel nozzle for injecting the fuel into the precombustion chamber, an air reservoir separated from the precombustion chamber by the main combustion space, a throttling opening between the precombustion chamber and the main combustion space, a further throttling opening between the air reservoir and the main combustion space, the two throttling openings being directed substantially towards one another, so that the jet of highly heated fuel emerging from the throttling opening of the precombustion chamber after traversing the main combustion space meets the substantially oppositely directed stream of air emerging from the air reservoir.

2. In an internal combustion engine a main combustion space, a precombustion chamber, a nozzle for injecting the fuel into the said precombustion chamber, a throttling opening between the precombustion chamber and the main combustion space, an air reservoir arranged with regard to the precombustion chamber substantially on the opposite side of the main combustion space, a further throttling opening between the air reservoir and the main combustion space, the said two throttling openings opening into the main combustion space substantially on opposite sides thereof and being directed substantially oppositely to one another.

3. In an internal combustion engine the combination as claimed in claim 1, and in which the precombustion chamber axis is substantially parallel to and the air reservoir axis substantially perpendicular to the cylinder axis, and the throttling opening of the precombustion chamber is directed substantially perpendicularly with respect to the precombustion chamber axis towards the throttling opening of the air reservoir, 4. In an internal combustion engine, a main combustion space, an air reservoir having a throttling opening for establishing open communication between the main combustion space and said reservoir on one side of the main combustion space, a precombustion chamber having a fuel discharge aperture and fuel supply means for said precombustion chamber, said precombustion chamber being arranged at the opposite side of the main combustion space with its fuel discharge aperture directed to discharge the contents of the precombustion chamber across the main combustion space towards the said throttling opening.

5. In an internal combustion engine, a main combustion space, a cylinder, a piston therein having a channel-like depression in the end thereof, an air reservoir in open communication with said main combustion space, a precombustion chamber having a fuel discharge aperture and fuel supply means for said precombustion chamber, said precombustion chamber being arranged with its fuel discharge aperture directed to discharge the contents of the precombustion chamber along said channel-like depression substantially into the air chamber.

6. In an internal combustion engine, the combination as set forth in claim 5, in which the precombustion chamber is arranged with its axis substantially parallel to the cylinder axis and the fuel discharge aperture is located in the side of the precombustion chamber.

7. In an internal combustion engine, the combination as set forth in claim 5, in which the precombustion chamber is arranged with its axis substantially parallel to the cylinder axis and the fuel discharge aperture is located in the side of the precombustion chamber, the axis of the air reservoir extending substantially radially.

8. In an internal combustion engine a piston having a channel-like depression in the end thereof, a main combustion space formed in part by said channel-like depression, a precombustion chamber, a fuel nozzle for injecting the fuel into the precombustion chamber, an air reservoir separated from the precombustion chamber by the main combustion space, a throttling opening between the precombustion chamber and the main combustion space, a further throttling opening between the air reservoir and the main combustion space, the said channel-like depression in the piston end extending from the precombustion chamber to the air reservoir and the two throttling openings being directed substantially towards one another, so that the jet of fuel emerging from the throttling opening of the precombustion chamber traverse the channel-like depression and meets the substantially oppositely directed stream of air emerging from the air reservoir.

9. In an internal combustion engine a piston having a channel-like depression in the end thereof, a main combustion space formed in part by said channel-like depression, a precombustion chamber, a fuel nozzle for injecting the fuel into the precombustion chamber, an air reservoir separated from the precombustion chamber by the main combustion space, a throttling opening between the precombustion chamber and the main combustion space, a further throttling opening between the air reservoir and the main combustion space, the said channel-like depression in the piston end extending from the precombustion chamber to the air reservoir and flaring in a funnel-shaped manner towards the air reservoir and the two throttling openings being directed substantially towards one another, so that the jet of fuel emerging from the throttling opening of the precombustion chamber traverses the channel-like depression and meets the substantially oppositely directed stream of air emerging from the air reservoir.

10. In an internal combustion engine, a precombustion chamber, a fuel nozzle for injecting the fuel into the precombustion chamber, an air reservoir, a channel-like main combustion space extending from the precombustion chamber to the air reservoir, a throttling opening between the precombustion chamber and the main combustion space substantially at one end of the main combustion space, a further throttling opening between the air reservoir and the main combustion space substantially at the other end of the main combustion space, said throttling openings being directed substantially towards one another, so that the jet of fuel emerging from the throttling opening of the precombustion chamber and traversing the channel-like main combustion space meets the substantially oppositely directed stream of air emerging from the air reservoir.

11. In an internal combustion engine, a main combustion space, a precombustion chamber, a fuel nozzle for injecting the fuel into the combustion chamber, an air reservoir separated from the precombustion chamber by the main combustion space, a throttling opening between the air reservoir and the main combustion space, a further throttling opening between the precombustion chamber and the main combustion space, an impact surface disposed between the two throttling openings in the main combustion space such that a jet emerging from the throttling opening of the precombustion chamber is directed towards the impact surface and after being reflected on the latter substantially towards the throttling opening of the air reservoir and in opposition to the stream of air emerging from the latter.

12. In an internal combustion engine the combination claimed in claim 11 and having a piston, the end of which is adapted to act as the impact surface for the jet of fuel emerging from the precombustion chamber.

13. In an internal combustion engine the combination claimed in claim 11 and in which the axis of the precombustion chamber and the axis of the air reservoir are arranged at a substantially opposite inclination to the cylinder axis on opposite sides of the latter.

14. In an internal combustion engine a main combustion space, a precombustion chamber, a nozzle for injecting the fuel into the said precombustion chamber, a plurality of throttling openings between the precombustion chamber and the main combustion space, which are directed towards different sides of the main combustion space, air reservoirs lying in each case opposite at least two of the said throttling openings, further throttling openings between the air reservoir and the main combustion space, the throttling openings being so arranged that the jet of fuel emerging from the particular throttling opening of the precombustion chamber and the jet of air emerging from the air reservoir meet one another.

15. In an internal combustion engine the combination claimed in claim 14 and in which the precombustion chamber is substantially central in the cylinder axis and the air reservoirs are arranged substantially radially with respect to the cylinder.

KURT THOMAS.